United States Patent [19]
Saffelle et al.

[11] Patent Number: 6,106,214
[45] Date of Patent: Aug. 22, 2000

[54] DOLLY ASSEMBLY

[76] Inventors: Paul Saffelle, 7730 Helena Dr., Falls Church, Va. 22043; Georg Seyrlehner, 420 Woodards Ford Rd., Chesapeake, Va. 23322; Paul Craze, 3004 Indian River Rd., Chesapeake, Va. 23325

[21] Appl. No.: 09/028,335

[22] Filed: Feb. 24, 1998

[51] Int. Cl.⁷ .................................................. B60B 29/00
[52] U.S. Cl. .......................................... 414/427; 414/429
[58] Field of Search .................................. 414/426–429; 29/273

[56]                     References Cited

U.S. PATENT DOCUMENTS

| | | | |
|---|---|---|---|
| 1,650,031 | 11/1927 | Nash | 414/428 |
| 1,731,204 | 10/1929 | Recchia | 414/427 |
| 1,964,119 | 6/1934 | Hendry | 29/273 |
| 2,252,534 | 8/1941 | Trotter | 414/428 |
| 2,326,684 | 8/1943 | Ross | 414/427 |
| 2,514,781 | 7/1950 | Miller | 414/427 |
| 2,516,260 | 7/1950 | Schildmeier | 414/427 |
| 2,543,296 | 2/1951 | Meredith | 414/427 |
| 2,583,216 | 1/1952 | Hoffman | 414/527 |
| 2,640,604 | 6/1953 | Curley | 414/427 |
| 2,644,597 | 7/1953 | Lewis | 414/427 |
| 3,035,812 | 5/1962 | Wineteer | 414/427 X |
| 3,036,723 | 5/1962 | McCormick et al. | 414/427 |
| 3,653,527 | 4/1972 | Seymour | 414/427 |
| 3,749,265 | 7/1973 | Smith, Jr. | 414/427 |
| 3,830,387 | 8/1974 | Virnig | 414/429 X |
| 3,830,388 | 8/1974 | Mott | 414/429 |
| 3,850,321 | 11/1974 | Virnig | 414/428 X |
| 3,951,287 | 4/1976 | Cofer | 414/427 |
| 4,042,139 | 8/1977 | Pernsteiner et al. | 414/427 |
| 4,050,597 | 9/1977 | Hawkins | 414/427 |
| 4,692,082 | 9/1987 | Smith | 414/429 |
| 4,771,531 | 9/1988 | Asher | 414/427 X |
| 4,846,484 | 7/1989 | Nekola | 280/43.11 |
| 4,854,803 | 8/1989 | Coccaro | 414/429 |
| 4,976,449 | 12/1990 | Lotspeich et al. | 280/79.4 |
| 5,112,070 | 5/1992 | Hahn | 280/79.4 |

*Primary Examiner*—Douglas Hess
*Attorney, Agent, or Firm*—Rader, Fishman & Grauer PLLC

[57]                         ABSTRACT

A dolly assembly for lifting and supporting a single vehicle tire includes a wheel mounted support frame having a first support bar connected to a second support bar, a slidable member engaged with the second support bar, and a pair of tire lift paddles connected to the slidable member. The slidable member is movable along the second support bar by a lift spindle or a hydraulic lift, which serves to move the pair of tire lift paddles into contact with the vehicle tire, thereby lifting it. An upper housing is attached to the top of the second support bar. The upper housing carries an upper support pad which contacts an upper outside surface of the vehicle tire. An optional securing strap is also provided to further secure the vehicle tire on the dolly assembly.

5 Claims, 4 Drawing Sheets

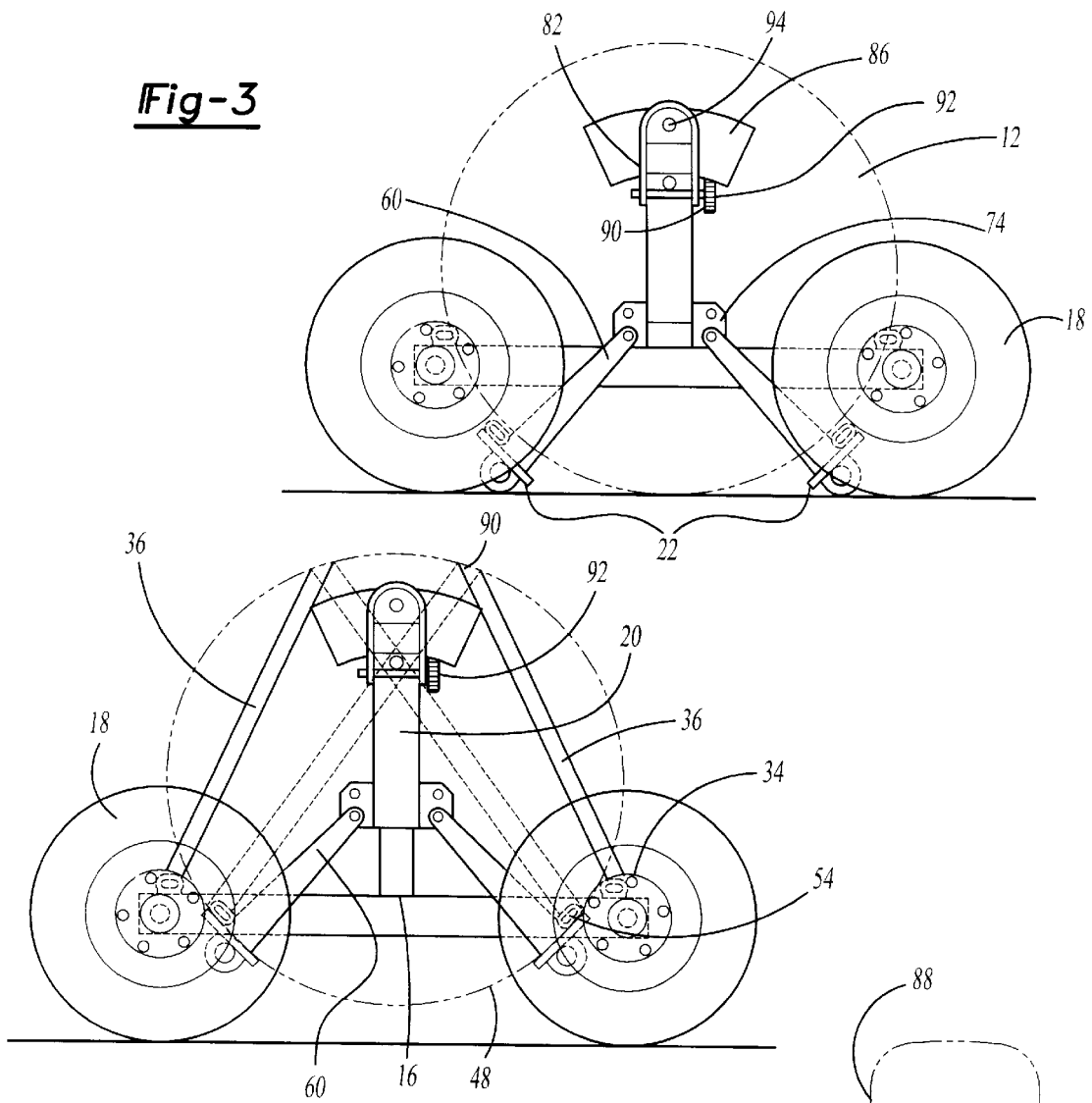
Fig-3
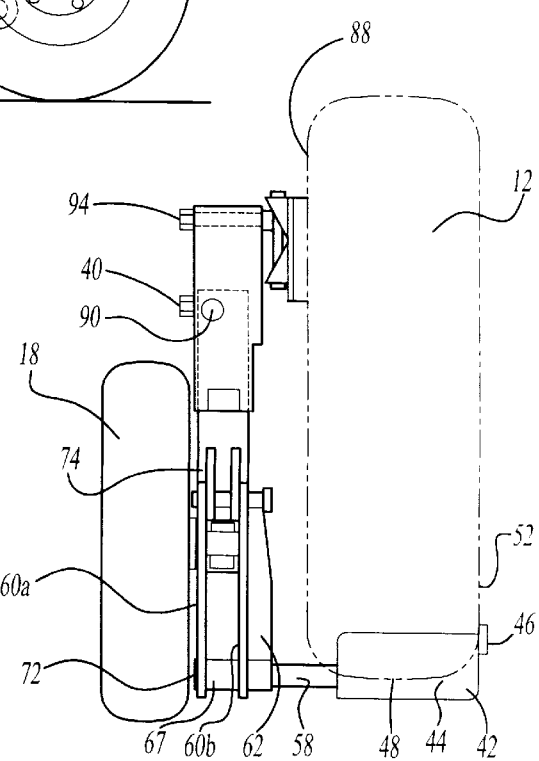
Fig-4
Fig-5

DOLLY ASSEMBLY

FIELD OF THE INVENTION

The present invention relates to dolly assemblies, and more particularly to a dolly assembly for lifting and supporting a single vehicle tire while the tire remains mounted on the vehicle.

BACKGROUND OF THE INVENTION

Dolly assemblies are well known as an automotive accessory for supporting vehicle tires. Typical dolly assemblies have a relatively heavy frame unit that is mounted on a set of four wheels. In order to position the dolly assembly under a vehicle tire, an auxiliary jack is needed to raise the vehicle. These types of dolly assemblies are undesirable due to the extra time and effort it takes to properly position and operate the auxiliary jack, as well as positioning the dolly assembly under the vehicle tire. There is also an additional cost associated with having to purchase the auxiliary jack. Further, due to the weight of these types of dolly assemblies, they are often difficult to transport.

Other known dolly assemblies have tried to alleviate the above disadvantages by providing caster mounted frame members that are connected together by a shaft. The shaft includes a crank handle which can be operated to move the frame members together, with frame members contacting the outside surface of the vehicle tire. As the frame members move together, the vehicle tire becomes supported by the frame members. While this type of arrangement is relatively lightweight and portable, the frame members do not have a sufficient structural strength to lift a vehicle tire while it is still mounted to the vehicle, thereby necessitating an auxiliary jack to initially support the weight of the vehicle.

Other known dolly assemblies have tried to eliminate the need for the auxiliary jack by providing a dolly assembly with a lifting mechanism. An example of this type of dolly assembly is a caster mounted U-shaped frame member with integral roller assemblies for contacting an outside surface of the vehicle tire. A lever cooperates with notches to drive arms the roller assemblies toward each other, thereby engaging vehicle tire and lifting it. While this type of arrangement does not require the use of an auxiliary jack, it is awkward to use as it requires constant resetting and releveraging of the lever on the frame member to successively drive the roller assemblies against the vehicle tire to lift it. Further, because of the constant resetting, this type of dolly assembly takes a significant amount of time to operate.

Another known combination dolly and jack assembly includes a pair of dolly carriages mounted on small wheels and having shoes for engaging a vehicle tire. The dolly carriages are connected together by a jack screw and by pivoting brace arms. The brace arms are further secured to a clamp that engages an axle hub of the vehicle tire. In operation, the shoes are positioned under the vehicle tire and connected to a stationary part of the vehicle by adjustable links. The clamp is then secured to the axle hub. The jack screw is operated to move the dolly wheel and shoes together, thereby lifting the vehicle tire. Once the vehicle tire is lifted, tumbuckles on the adjustable links are adjusted to properly support the vehicle tire. While an auxiliary jack is not required, the assembly has numerous components which increase manufacturing costs, and the possibility of a assembly failure. Further, the assembly requires a significant amount of time to be properly positioned on the vehicle tire and different tools for adjusting the tumbuckles and operating the jack screw.

Yet another type of dolly assembly is known in which a coaxial pair of vehicle tires are supported while the tires remain on the vehicle. With such an assembly, a pair of dolly bases, each of which are mounted on dolly wheels, are placed on the outside of each tire and two cross arm assemblies are extended transversely between the vehicle tires to connect the two dolly bases together. A lifting means is associated with the cross-arm assemblies to lift the cross-arms into engagement with the vehicle tires. While the assembly is useful for towing vehicles, it is not designed for supporting a single vehicle tire. Further, the cross-arm assemblies are relatively heavy, thereby making it rather difficult for an individual user to operate. Additionally, the assembly requires a significant amount of time to operate as it involves properly positioning the dolly bases, attaching the cross arm assemblies, and actuating the lifting means.

SUMMARY OF THE INVENTION

The present invention is directed to a dolly assembly for use with a single vehicle tire that is mounted to a vehicle. The dolly assembly includes a lightweight support frame, a slidable member that is movable along the support frame, and at least one lift paddle connected to the slidable member for lifting and supporting the vehicle tire.

In one embodiment, the support frame has a first support bar and a second support bar, the second support bar being connected to the first support bar. A set of wheels are rotatably mounted on the first support bar and the slidable member is engaged with the second support bar. The slidable member is movable along the second support bar into one of two positions, a lifting position and a loading position. Preferably, the slidable member is actuated by a lift spindle, such that the dolly assembly may be quickly and easily operated by a single user.

The dolly assembly preferably includes two tire lift paddles which are connected to lift arms. The lift arms orient the tire lift paddles at an angle such that they can be positioned under the vehicle tire without having to use an auxiliary jack. When the slidable member is in the loading position, the tire support paddles are close to the ground and can be easily slid under the vehicle tire. As the lift spindle is operated, the slidable member is moved toward the lifting position and the lift arms move the tire lift paddles into contact with an outer surface of the vehicle tire, thereby lifting the vehicle tire. A lip connected to a distal end of each lift paddle is positioned adjacent to an interior side surface of the vehicle tire to secure the vehicle tire onto the tire lift paddles.

An upper housing is connected to the top of the slidable member, the upper housing carrying an upper support pad for contacting an upper outer surface of the vehicle tire. A separate housing spindle operates to move the upper support pad to a predetermined height for contacting the vehicle tire, while a support pad spindle moves the upper support pad into contact with the vehicle tire.

The dolly assembly preferably further includes at least one securing strap for securing the vehicle tire to the dolly assembly. The securing strap has one end secured to the support frame and the other end connected to one of the lift paddles.

A second embodiment of the dolly assembly is also disclosed. The second dolly assembly is similar to the first in that it too, has a support frame with a first support bar and a second support bar, a pair of wheels rotatably mounted on the first support bar, and an upper housing with an upper support pad. The second dolly assembly also includes a slidable member that is engaged with the second support bar and movable into one of two positions, a lifting position and a loading position. Preferably, the slidable member is actuated by a hydraulic lift, thereby making the dolly assembly very easy to use.

The slidable member further includes a bracket which has key lock guides disposed thereon. A pair of lift arms, each attached to a tire lift paddle, are engagable with the key lock guides, thereby connecting the tire lift paddles to the slidable member. Further, the key lock guides are preferably angled such that the tire can be slid under the vehicle tire without having to use an auxiliary jack.

BRIEF DESCRIPTION OF THE DRAWINGS

The features and inventive aspects of the present invention will become more apparent upon reading the following detailed description, claims, and drawings, of which the following is a brief description:

FIG. 3 is front view of the dolly assembly in a lowered position.

FIG. 4 is a front view of the dolly assembly in a lifting position.

FIG. 5 is a side view of the dolly assembly with a tire thereon.

DETAILED DESCRIPTION OF PREFERRED EMBODIMENTS

Figure 1:
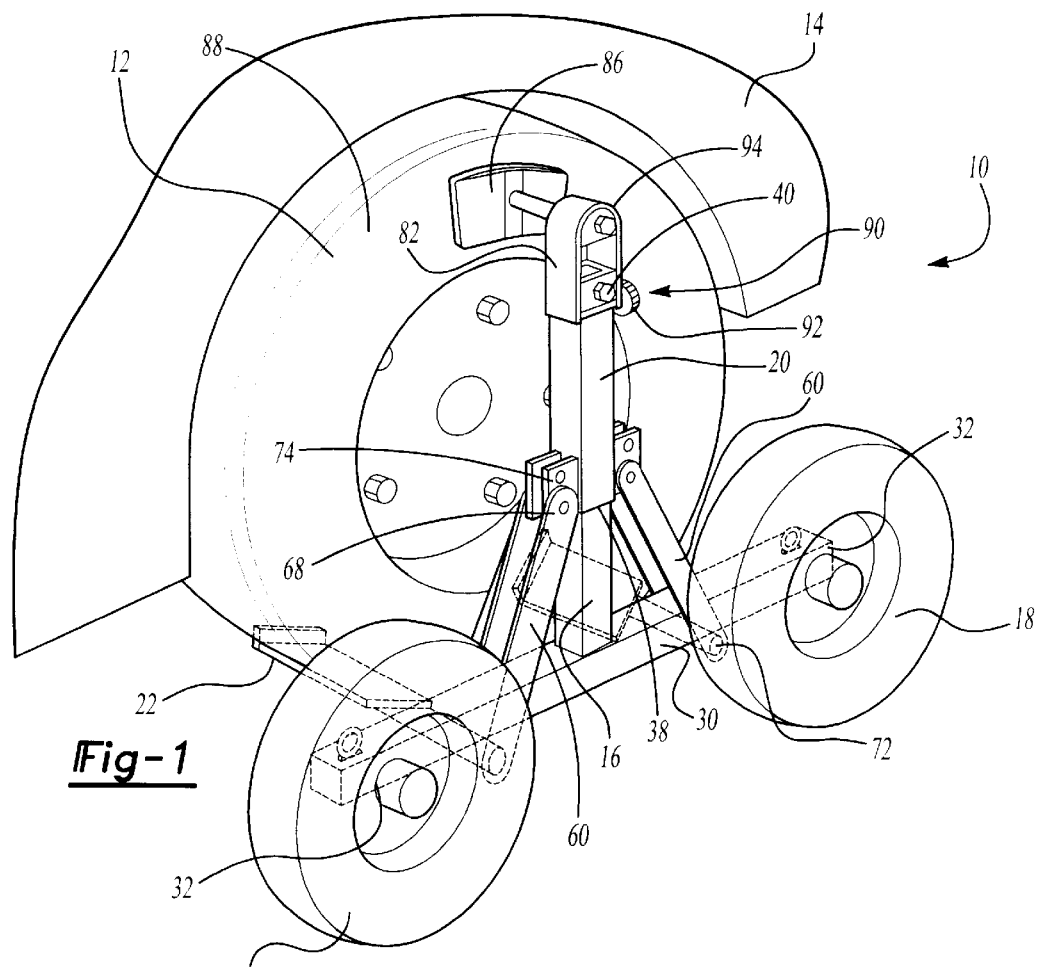
FIG. 1 is a perspective view of a dolly assembly supporting a vehicle tire in accordance with the present invention.
Figure 2:
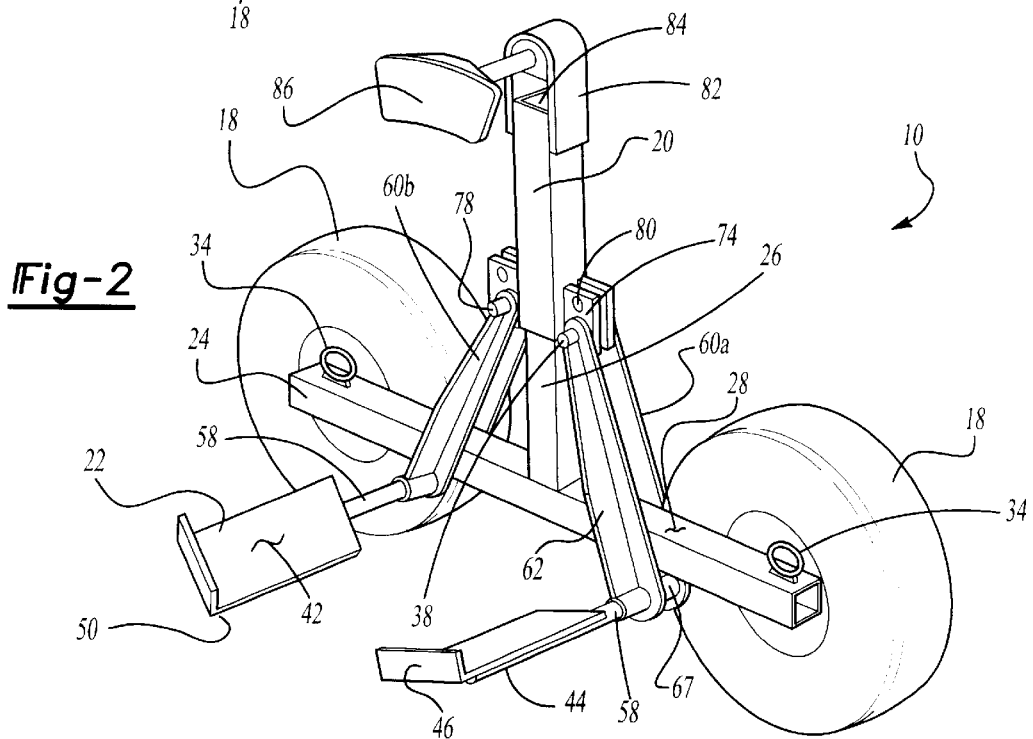
FIG. 2 is a perspective view of the dolly assembly.

FIGS. 1 and 2 show a dolly assembly 10 for supporting a tire 12 while it is still mounted to a vehicle 14. Dolly assembly 10 includes a T-shaped support frame 16, a pair of wheels 18, and a slidable member 20 engaged with support frame 16 that has at least one tire lift paddle 22 connected thereto. Preferably, dolly assembly 10 includes two tire lift paddles 22, described later in greater detail, that are adapted to engage tire 12 without requiring an auxiliary jack to raise the tire 12.

Support frame 16 has a first support bar 24 and a second support bar 26 which re preferably hollow members such that support frame 16 is relatively lightweight. First support bar 24 has a top surface 28, a front surface 30, and ends 32. Wheels 18 are rotatably mounted on front surface 30 at ends 32. Preferably, ends 32 each include a sling eye 34 mounted on top surface 28 to which a securing strap 36, discussed later in greater detail, may attach to further secure tire 12 to dolly assembly 10.

Second support bar 26 is positioned generally perpendicular to first support bar 24 with a bottom end 38 of second support bar 26 being fixedly connected to top surface 28 of first support bar 24. Slidable member 20 is movably engaged with second support bar 26 such that slidable member 20 is movable along second support bar 26 between one of two positions, a loading position as seen in FIG. 3, or a lifting position as seen in FIG. 4. A lift spindle 40 is provided to move slidable member 20 along second support bar 26. Lift spindle 40 is preferably operated by a conventional wrench (not shown) or a hand crank, and geared such that it is easy to raise and lower slidable member 20 with readily available tools.

Tire lift paddles 22 each have a top surface 42, a bottom surface 44, and a lip 46. Top surface 42 is adapted to contact an underside surface 48 of tire 12 when it is positioned on dolly assembly 10. Lip 46 is positioned on a distal end 50 of lift paddle 22 spaced away from support bar 24, as best seen in FIG. 5. Lip 46 is adapted to contact an interior side surface 52 of tire 12 to properly position tire 12 on tire lift paddles 22. Preferably, lip 46 further includes a sling eye 54 to which securing strap 36 may attach. In the preferred embodiment, tire lift paddles 22 are positioned at an angle with respect to second support bar 26 such that tire lift paddles 22 may be easily slid under tire 12 without requiring an auxiliary jack to first raise the tire.

Bottom surface 44 of each tire lift paddle 22 is connected to and supported by a lateral arm 58. Lateral arm 58 is preferably connected to bottom surface 44 by welding or other suitable means. Lateral arms 58 are connected to at least one lift arm 60. Preferably, each lateral arm 58 is connected to two lift arms 60, a front lift arm 60a and a rear lift arm 60b, which are positioned at an angle with respect to second support bar 26 and disposed on either side of first support bar 24 for increased stability of dolly assembly 10. Further, rear left arms 60b preferably include a raised portion 62 that contacts an outside surface 64 of tire 12, to ensure that dolly assembly 10 is properly positioned against tire 12 when dolly assembly 1 Q is in the loading position.

Front and rear lift arms 60a and 60b each have upper ends 68 and lower ends 70. Each lateral arm 58 extends through lower ends 70 of lift arms 60a and 60b, thereby connecting lateral arm 58 to lift arms 60a and 60b, with a distal end 72 of lateral arm 58 being flush with front lift arm 60a. In one preferred embodiment, lateral arms 58 are generally cylindrical, and are received in sleeves 67 associated with lift arms 60. Arms 58 are able to selectively rotate within sleeves 67, allowing the angle of each lift paddle to change depending upon the nature of a particular tire 12.

Upper ends 68 are fixedly connected to slidable member 20 such that lift arms 60a and 60b move with slidable member 20, thereby lifting tire lift paddles 22. In the preferred embodiment, slidable member 20 further includes at least one bracket member 74 attached to a bottom end 38 of slidable member 20. Upper ends 68 of lift arms 60a and 60b are fixedly connected to bracket member 74 by means of screws 78 or other suitable fasteners, which extend through apertures 80 and of bracket member 74. The position of tire lift paddles 22 can be easily adjusted by loosening screws 78 and moving lift arms 60a and 60b to a desired angle.

Dolly assembly 10 further includes a movable upper housing 82 that is connected to a top end 84 of slidable member 20. Upper housing 82 carries an upper support pad 86 for contacting an upper outside surface 88 of tire 12. Upper housing 82 is movable along slidable member 20 by means of a housing spindle 90 such that upper support pad 86 can be raised or lowered to a predetermined height for contacting upper outside surface 88 of different sized tires 12. Housing spindle 90 is preferably operated by a knob 92 such that it is easy to raise and- lower upper housing 82 without requiring any tools.

Upper housing 82 further includes a support pad spindle 94. Support pad spindle 94 operates to move upper support pad 86 laterally into contact with upper outside surface 88 of tire 12 to vertically align dolly assembly 10 with vehicle 14. Support pad spindle 94 is preferably operated by a conventional wrench (not shown) or a hand crank, such that the same tool may be used for both lift spindle 40 and support pad spindle 94.

Figure 6:
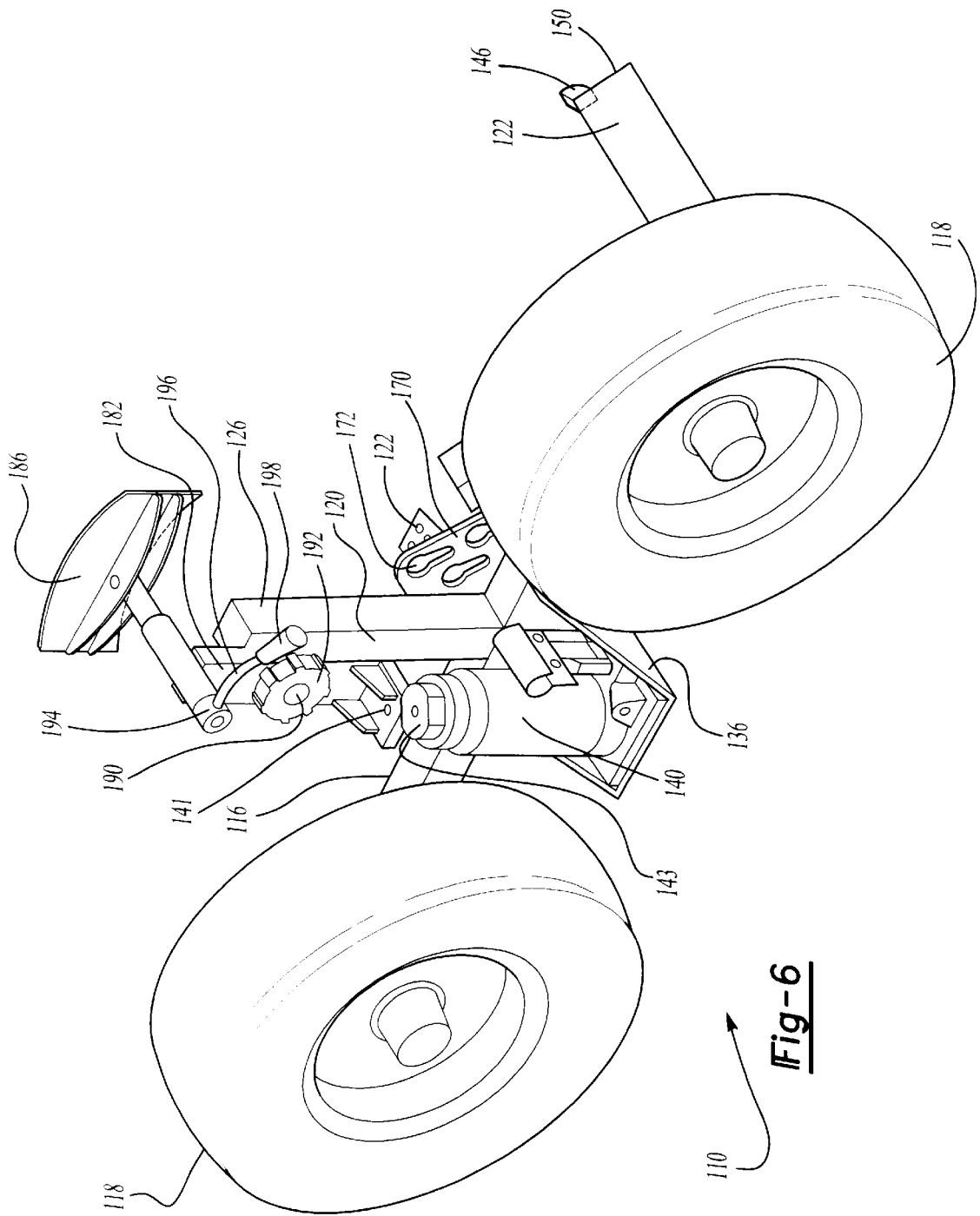
FIG. 6 is a perspective view of an alternative embodiment for the dolly assembly.
Figure 7:
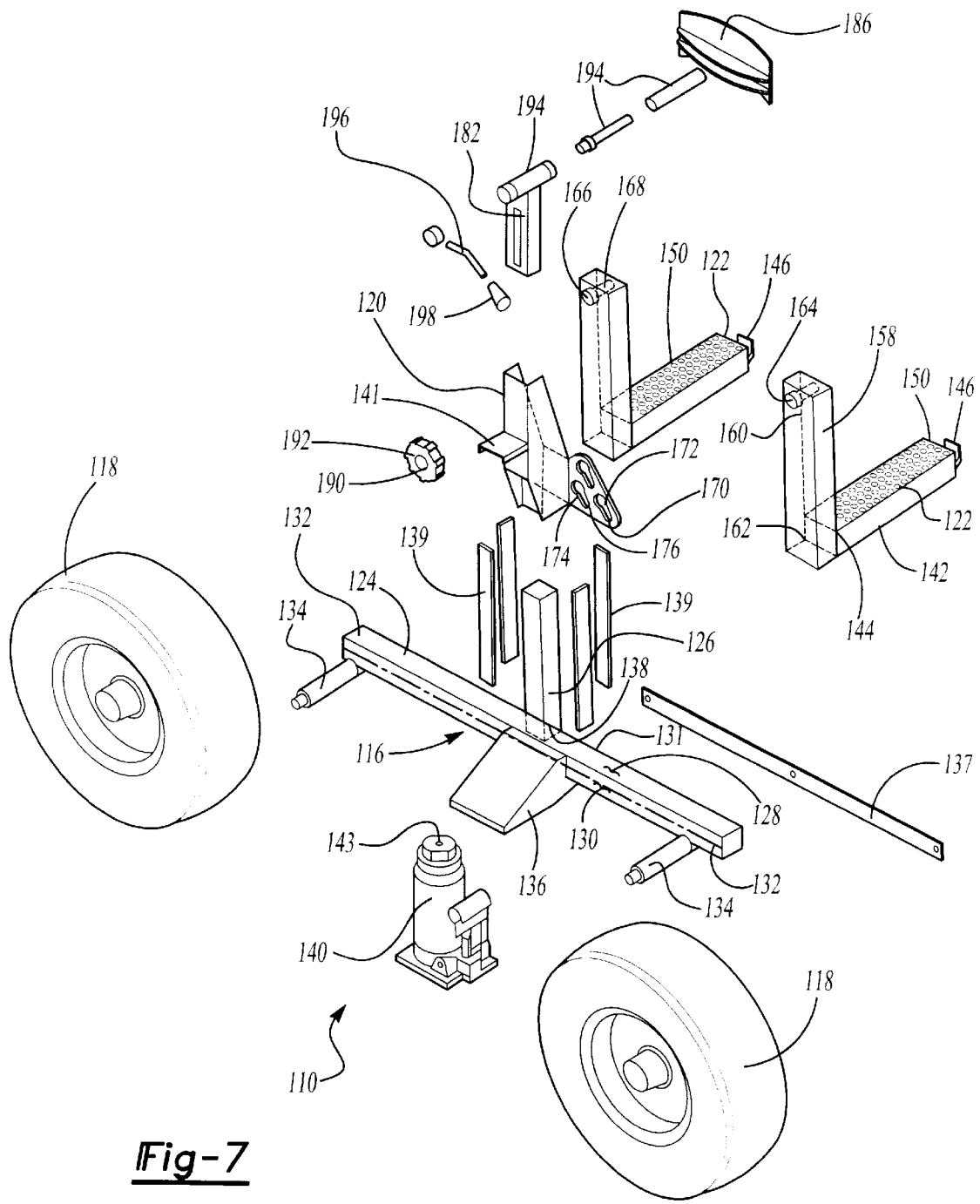
FIG. 7 is an exploded view of the alternative embodiment.

An alternative embodiment of the dolly assembly is shown in FIGS. 6 and 7. Similar to dolly assembly 10, dolly assembly 110 includes a T-shaped support frame 116, a pair of wheels 118, and a slidable member 120 engaged with support frame 116 that has at least one tire lift paddle 122 attached thereto. Preferably, dolly assembly 110 includes two tire lift paddles 122, described later in greater detail, that are adapted to engage tire 12 without requiring an auxiliary jack to first raise the tire 12.

Support frame 116 has a first support bar 124 and a second support bar 126. First support bar 124 has a top surface 128, a front surface 130, a rear surface 131, and ends 132. Wheels 118 are rotatably mounted on shafts 134 that are connected to front surface 130 at ends 132. A mounting plate 136, to be discussed below, is mounted on front surface 130. An optional wear strip 137, which is constructed of plastic or similar material, may be placed on rear surface 131 to protect first support bar 124 against damage.

Second support bar 126 is positioned generally perpendicular to first support bar 124 with a bottom end 138 of second support bar 126 being fixedly connected to top surface 128 of first support bar 124. Optional wear strips 139, similar to wear strip 137, may be place on the perimeter of second support bar 126 to protect against possible damage. Slidable member 120 is movably engaged with second support bar 126, over wear strips 139, such that slidable member 120 is movable along second support bar 126 between one of two positions, a loading position or a lifting position. Slidable member 120 further includes a contacting plate 141, to be discussed later in greater detail. A mechanical lift, or hydraulic lift 140, which is positioned on mounting plate 136, is provided to move slidable member 120 along second support bar 126. Hydraulic lift 140 includes a movable top portion 143, which is easily operated without requiring any additional tools.

Tire lift paddles 122 each have a top surface 142, a proximate end 144, and a lip 146. Top surface 142 is adapted to contact an underside surface 48 of tire 12 when it is positioned on dolly assembly 110. Top surface 142 may include a textured surface so as to better grip tire 12. In the preferred embodiment, tire lift paddles 122 are positioned at an angle with respect to support bar 124 such that tire lift paddles 122 may be easily slid under vehicle tire without requiring an auxiliary jack to first raise tire 12. Lip 146 is positioned on a distal end 150 of lift paddles 122 spaced away from support bar 124. Lip 146 is adapted to contact interior side surface 52 of tire 12 to properly position tire 12 on tire lift paddles 122.

Proximate ends 144 of each tire lift paddle 122 are connected to and supported by a lift arm 158. Lift arms 158 each have a top end 160 and a bottom end 162. Bottom ends 162 are preferably connected to proximate ends 144 by welding or other suitable means. Top ends 160 each have a connecting protrusion 164 disposed thereon for connecting lift arms 158 to slidable member 120. Connecting protrusion 164 is preferably a pin such that it has a disc-type end 166 and a shaft-like body 168, which is secured to top end 160 by welding or other suitable means.

Connecting protrusions 164 are selectively engaged with slidable member 120 such that lift arms 158 move with slidable member 120, thereby moving tire lift paddles 122. In the preferred embodiment, slidable member 120 further includes brackets 170 attached to bottom end 138 of slidable member 120. Each bracket 170 includes at least one key lock guide 172 which is adapted to receive connecting protrusion 164, thereby connecting lift arms 158 to slidable member 120 without requiring any tools. Key lock guide 172 includes an aperture 174 that is sized slightly larger than disc-type end 166 of connecting protrusion 164, and a slot 176 that corresponds in width to that of shaft-like body 168. Key lock guides 172 are angled so as to facilitate the proper positioning of lift arms 158 such that tire lift paddles 122 may be slid under tire 12 without requiring an auxiliary jack. Further, a plurality of key lock guides 172 are provided on each bracket 170 to allow for proper adjustment of the lift arms 158 and tire lift paddles 122 for different sized tires 12.

Dolly assembly 110 further includes a movable upper housing 182 that is engaged with an slidable member 120. Upper housing 182 carries an upper support pad 186 for contacting an upper outside surface 88 of tire 12. Upper housing 182 is movable along slidable member 120 by means of a housing spindle 190 such that upper support pad 186 can be raised or lowered to a predetermined height for contacting upper outside surface 88 of different sized tires 12. Housing spindle 190 is preferably operated by a knob 192 such that it is easy to raise and lower upper housing 182 without requiring any tools.

Upper housing 182 further includes a support pad spindle 194. Support pad spindle 194 operates to move upper support pad 186 laterally into contact with upper outside surface 88 of tire 12 to vertically align dolly assembly 110 with vehicle 14. Support pad spindle 194 is preferably operated by an integral wrench 196 that may further includes an optional handle 198. By providing integral wrench 196, dolly assembly 110 is fully operational without requiring any additional tools.

OPERATION OF THE DOLLY ASSEMBLY

Now referring to FIGS. 3–5, the operation of dolly assembly 10 will be described. Referring to FIG. 3, dolly assembly 10 is in the loading position when bottom end 38 of slidable member 20 is in contact with top surface 28 of first support bar 24. Lift arms 60 are positioned at a predetermined angle such that tire lift paddles 22 are low to the ground surface , thereby providing clearance for positioning tire lift paddles 22 under tire 12. Tire lift paddles 22 are slid under tire 12 and the dolly assembly 10 is positioned against tire 12 until raised portions 62 of rear lift arms 60b are adjacent outside surface of tire 12 with lip 46 being positioned adjacent to interior side surface 52 of tire 12.

Alternatively, lift arms 60 could be positioned vertically, such that tire lift paddles 22 would contact underside surface 48 of tire 12 at generally the center of tire 12. In this instance tire 12 would need to be jacked up by means of an auxiliary jack to position tire lift paddles 22.

Referring to FIG. 4, a wrench or a hand crank is used to actuate lift spindle 40 to move slidable member 20 toward the lift position, thereby causing tire lift paddles 22 to move vertically, contacting underside surface 48 of tire 12 and lifting it to a desired height. Next, housing spindle is actuated by knob 92 and upper housing 82 is moved to position upper support pad 86 to a desired height for contacting a portion of upper outside surface 88 of tire 12. The alignment of dolly assembly 10 is adjusted by actuating support pad spindle 94, thereby moving upper support pad 86 laterally into contact with upper outside surface 88 of tire 12. Securing straps 36 may then be secured around tire 12 with one strap extending from sling eye 34 on first support bar 24 to sling eye 54 on opposite tire lift paddle 22, such that securing straps 36 cross to hold tire 12 onto dolly assembly 10 during movement of vehicle 14.

A second dolly assembly 10a may be positioned on an opposing vehicle tire (not shown), such that vehicle 14 may be towed with dolly assemblies 10 and 10a supporting vehicle 14. In this instance, securing straps 36 may be secured as indicated above, or, alternatively, securing straps 36 may extend from first support bar 24 sling eyes 34 of first dolly assembly 10 to first support bar 24a sling eyes 34a of second dolly assembly 10a.

Referring to FIG. 6, operation of alternative dolly assembly 110 will be described. Dolly assembly 110 is in the loading position when bottom end 138 of slidable member 120 is in contact with top surface 128 of first support bar 124. Lift arms 158 are positioned at a predetermined angle by inserting connecting protrusions 164 into key lock guides 176, such that tire lift paddles 122 are low to the ground surface, thereby providing clearance for positioning tire lift paddles 122 under tire 12. Tire lift paddles 122 are then slid under vehicle tire 12 and the dolly assembly 110 is positioned against tire 12 with lip 142 being positioned adjacent to interior side surface 52 of tire 12.

Hydraulic lift 140 is then actuated such that movable top portion 141 moves into contact with contacting plate 141 and lifting slidable member 120 toward the lifting position, thereby causing tire lift paddles 122 to move vertically into contact with tire 12 and lifting it. Next, housing spindle 190 is actuated by knob 192 to move upper support pad 186 to a desired height for contacting a portion of upper outside surface 88 of tire 12. The alignment of dolly assembly 110 is adjusted by actuating support pad spindle 194, thereby moving upper support pad 186 laterally into contact with upper outside surface 88 of tire 12.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A dolly assembly for use with a vehicle tire, comprising:

a T-shaped support frame having a first support bar with a first end and a second end, and a second support bar with a top end and a bottom end, said bottom end of said second support bar mounted on said first support bar;

a wheel rotatably mounted on each of said first and second ends of said first support bar;

a slidable member engaged with said second support bar, said slidable member movable by means of a lift spindle along said second support bar to one of two positions, a lifting position and a loading position;

at least one bracket fixedly connected to said slidable member;

a plurality of lift arms, each of said lift arms having a first end and a second end, said first end being fixedly connected to said bracket;

at least two tire lift paddles connected to said second end of said lift arms such that when said slidable member moves to said lifting position along said second support bar, said tire lift paddles move towards and contact an outer surface of a vehicle tire, thereby lifting the vehicle tire; and an upper housing attached to said top end of said slidable member, said upper housing having an upper support pad for contacting the outer surface of the vehicle tire, a housing spindle for moving said upper housing to a predetermined height, and a support pad spindle for moving said upper support pad into contact with the outer surface of the vehicle tire.

2. A dolly assembly for use with a vehicle tire, comprising:

a support frame having a first support bar and a second support bar, said second support bar fixedly connected to a top surface of said first support bar;

a set of wheels rotatably mounted on said first support bar;

a slidable member engaged with said second support bar, said slidable member adapted to be moved along said second support bar to one of two positions, a lifting position and a loading position;

at least one lift arm having an upper end and a lower end, said upper end fixedly connected to said slidable member, said lower end connected to at least one tire lift paddle such that when said slidable member moves to said lifting position along said second support bar, said tire lift paddle moves upward and contacts a lower bottom surface of a vehicle tire, thereby lifting the vehicle tire; and an upper housing attached to said slidable member, said upper housing having a housing spindle and a laterally extending upper support pad, said housing spindle adapted to move said upper housing along said slidable member to position said upper support pad to a predetermined height for contacting an upper outer surface of the vehicle tire.

3. The dolly assembly of claim 2, wherein said upper housing further includes a support pad spindle to move said upper support pad laterally into contact with the upper outer surface of the vehicle tire to vertically align said dolly assembly with the vehicle.

4. The dolly assembly of claim 2, wherein said slidable member is movable along said second support bar by a lift spindle.

5. The dolly assembly of claim 4, wherein said upper housing further includes a support pad spindle to move said upper support pad laterally into contact with the vehicle tire to vertically align said dolly assembly with the vehicle.

* * * * *